US008638707B2

(12) United States Patent
Chun et al.

(10) Patent No.: US 8,638,707 B2
(45) Date of Patent: Jan. 28, 2014

(54) METHOD FOR SUPPORTING QUALITY OF MULTIMEDIA BROADCAST MULTICAST SERVICE (MBMS) IN MOBILE COMMUNICATIONS SYSTEM AND TERMINAL THEREOF

(75) Inventors: Sung-Duck Chun, Gyeonggi-Do (KR); Young-Dae Lee, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/305,920

(22) PCT Filed: Jun. 21, 2007

(86) PCT No.: PCT/KR2007/003021
§ 371 (c)(1),
(2), (4) Date: May 26, 2010

(87) PCT Pub. No.: WO2007/148934
PCT Pub. Date: Dec. 27, 2007

(65) Prior Publication Data
US 2010/0226263 A1    Sep. 9, 2010

Related U.S. Application Data

(60) Provisional application No. 60/815,722, filed on Jun. 21, 2006.

(30) Foreign Application Priority Data

Apr. 30, 2007    (KR) .................. 10-2007-0042094

(51) Int. Cl.
*H04W 4/06* (2009.01)
(52) U.S. Cl.
CPC ...................................... *H04W 4/06* (2013.01)
USPC ........................................................ 370/312
(58) Field of Classification Search
CPC ...................................................... H04W 4/06
USPC ......... 370/310, 312, 332, 346, 433, 447, 449, 370/462, 468
See application file for complete search history.

(56) References Cited

U.S. PATENT DOCUMENTS

| 5,754,754 A | 5/1998 | Dudley et al. |
| 6,138,158 A | 10/2000 | Boyle et al. |

(Continued)

FOREIGN PATENT DOCUMENTS

| CN | 1267146 | 9/2000 |
| CN | 1411668 | 4/2003 |

(Continued)

OTHER PUBLICATIONS

Xu, H., et al.; "Performance Analysis on the Radio Link Control Protocol of UMTS System"; 2002 IEEE 56th Vehicular Technology Conference Proceedings; pp. 2026-2030; Sep. 2002.

(Continued)

*Primary Examiner* — Ricky Ngo
*Assistant Examiner* — Phuongchau B Nguyen
(74) *Attorney, Agent, or Firm* — Lee, Hong, Degerman, Kang & Waimey (57) ABSTRACT

In a wireless mobile communications system, a method of supporting quality of Multimedia Broadcast Multicast Service (MBMS) while using minimum possible radio resource(s) of a cell. A method of providing a multimedia multicast broadcast service (MBMS) in a wireless communications system that may include: transmitting a feedback configuration parameter to at least one terminal that is subscribed in a MBMS service; transmitting a MBMS service data to the at least one terminal; and receiving feedback information from the at lest one terminal that uses the feedback configuration parameter for a transmission of the feedback information.

7 Claims, 5 Drawing Sheets

(56) References Cited

U.S. PATENT DOCUMENTS

| | | |
|---|---|---|
| 6,317,430 B1 | 11/2001 | Knisely et al. |
| 6,381,229 B1 | 4/2002 | Narvinger et al. |
| 6,421,540 B1 | 7/2002 | Gilhousen et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,054,289 B1 | 5/2006 | Foster, Jr. et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,673,211 B2 | 3/2010 | Meyer et al. |
| 7,729,719 B2 | 6/2010 | Bergstrom et al. |
| 7,778,599 B2 | 8/2010 | Li et al. |
| 7,826,855 B2 | 11/2010 | Chun et al. |
| 7,826,859 B2 | 11/2010 | Lee et al. |
| 7,839,829 B2 | 11/2010 | Lee et al. |
| 7,848,308 B2 | 12/2010 | Lee et al. |
| 7,881,724 B2 | 2/2011 | Park et al. |
| 8,031,668 B2 | 10/2011 | Wang et al. |
| 8,036,110 B2 | 10/2011 | Ishii et al. |
| 8,068,511 B2 * | 11/2011 | Reznik et al. ............... 370/447 |
| 8,090,382 B2 | 1/2012 | Park et al. |
| 2001/0024956 A1 | 9/2001 | You et al. |
| 2001/0030953 A1 | 10/2001 | Chang |
| 2001/0046864 A1 | 11/2001 | Bhatoolaul et al. |
| 2002/0009129 A1 | 1/2002 | Choi et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0041578 A1 | 4/2002 | Kim et al. |
| 2002/0071480 A1 | 6/2002 | Marjelund et al. |
| 2002/0116515 A1 * | 8/2002 | Hashimoto ............... 709/230 |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0087655 A1 | 5/2003 | Matsuoka |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0210669 A1 | 11/2003 | Vayanos et al. |
| 2003/0223393 A1 | 12/2003 | Lee |
| 2003/0223452 A1 | 12/2003 | Toskala et al. |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0109422 A1 | 6/2004 | Naito |
| 2004/0109433 A1 | 6/2004 | Khan |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0160919 A1 | 8/2004 | Balachandran et al. |
| 2004/0171395 A1 | 9/2004 | Shin |
| 2004/0180675 A1 | 9/2004 | Choi et al. |
| 2004/0184437 A1 | 9/2004 | Lee et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0223507 A1 | 11/2004 | Kuchibhotla et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 * | 12/2004 | Ruuska et al. ............... 455/574 |
| 2005/0008035 A1 | 1/2005 | Eklund et al. |
| 2005/0013272 A1 | 1/2005 | Hwang et al. |
| 2005/0020260 A1 | 1/2005 | Jeong et al. |
| 2005/0025039 A1 | 2/2005 | Hwang et al. |
| 2005/0039101 A1 | 2/2005 | Torsner |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0113099 A1 | 5/2005 | Eriksson et al. |
| 2005/0114489 A1 | 5/2005 | Yonge, III et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0138528 A1 | 6/2005 | Ameigeiras et al. |
| 2005/0157678 A1 | 7/2005 | Mantha et al. |
| 2005/0157696 A1 | 7/2005 | Yamamoto et al. |
| 2005/0169232 A1 | 8/2005 | Sakoda et al. |
| 2005/0185608 A1 | 8/2005 | Lee et al. |
| 2005/0186973 A1 | 8/2005 | Gaal et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0207374 A1 | 9/2005 | Petrovic et al. |

(56) References Cited

U.S. PATENT DOCUMENTS

| | | |
|---|---|---|
| 2005/0213605 A1 | 9/2005 | Kim et al. |
| 2005/0220049 A1 | 10/2005 | Zhang et al. |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0250500 A1 | 11/2005 | Xu |
| 2005/0259662 A1 | 11/2005 | Kim et al. |
| 2005/0265301 A1 | 12/2005 | Heo et al. |
| 2005/0271025 A1 | 12/2005 | Guethaus et al. |
| 2005/0277429 A1 | 12/2005 | Laroia et al. |
| 2005/0281212 A1 | 12/2005 | Jeong et al. |
| 2005/0281219 A1 | 12/2005 | Kim et al. |
| 2005/0288026 A1 | 12/2005 | Byun et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0030342 A1 | 2/2006 | Hwang et al. |
| 2006/0045047 A1 | 3/2006 | Choi et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0083183 A1* | 4/2006 | Teague et al. .................. 370/278 |
| 2006/0088009 A1 | 4/2006 | Gibbs et al. |
| 2006/0120403 A1* | 6/2006 | Murata et al. .................. 370/468 |
| 2006/0143300 A1 | 6/2006 | See et al. |
| 2006/0146745 A1 | 7/2006 | Cai et al. |
| 2006/0153232 A1 | 7/2006 | Shvodian |
| 2006/0154680 A1 | 7/2006 | Kroth et al. |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0258383 A1 | 11/2006 | Jiang et al. |
| 2006/0282739 A1 | 12/2006 | Meyer et al. |
| 2006/0292982 A1 | 12/2006 | Ye et al. |
| 2007/0060146 A1 | 3/2007 | Won et al. |
| 2007/0071025 A1 | 3/2007 | Bergstrom et al. |
| 2007/0081483 A1 | 4/2007 | Jang et al. |
| 2007/0081513 A1 | 4/2007 | Torsner |
| 2007/0098006 A1 | 5/2007 | Parry et al. |
| 2007/0099619 A1 | 5/2007 | Parekh et al. |
| 2007/0104151 A1 | 5/2007 | Papasakellariou et al. |
| 2007/0117579 A1 | 5/2007 | Cai et al. |
| 2007/0121543 A1 | 5/2007 | Kuchibhotla et al. |
| 2007/0133458 A1 | 6/2007 | Chandra et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0206531 A1 | 9/2007 | Pajukoski et al. |
| 2007/0218930 A1 | 9/2007 | Kuo |
| 2007/0254662 A1 | 11/2007 | Khan et al. |
| 2007/0274253 A1* | 11/2007 | Zhang et al. .................. 370/328 |
| 2008/0004054 A1* | 1/2008 | Barbaresi et al. ............. 455/466 |
| 2008/0031253 A1 | 2/2008 | Kim et al. |
| 2008/0043619 A1 | 2/2008 | Sammour et al. |
| 2008/0069031 A1 | 3/2008 | Zhang et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2008/0285501 A1 | 11/2008 | Zhang et al. |
| 2009/0011769 A1 | 1/2009 | Park et al. |
| 2009/0129330 A1 | 5/2009 | Kim et al. |
| 2009/0156194 A1 | 6/2009 | Meylan |
| 2009/0175241 A1 | 7/2009 | Ohta et al. |
| 2009/0175253 A1 | 7/2009 | Wu et al. |
| 2009/0185477 A1 | 7/2009 | Lee et al. |
| 2009/0319850 A1 | 12/2009 | Baek et al. |
| 2009/0323624 A1 | 12/2009 | Kim |
| 2009/0323646 A1 | 12/2009 | Ketchum et al. |
| 2010/0014430 A1 | 1/2010 | Oka et al. |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2010/0226263 A1* | 9/2010 | Chun et al. .................... 370/252 |
| 2011/0038376 A1 | 2/2011 | Wiemann et al. |

FOREIGN PATENT DOCUMENTS

| | | |
|---|---|---|
| CN | 1649285 | 8/2005 |
| CN | 1656840 | 8/2005 |
| CN | 1658545 | 8/2005 |
| CN | 1663158 | 8/2005 |
| CN | 1669350 | 9/2005 |
| CN | 1692661 | 11/2005 |
| CN | 101601225 | 6/2012 |
| CN | 101690361 | 7/2012 |
| CN | 101248699 | 10/2012 |
| DE | 10305358 | 7/2004 |
| EP | 0978958 | 2/2000 |
| EP | 1009184 | 6/2000 |
| EP | 1172766 | 1/2002 |
| EP | 1213939 | 6/2002 |
| EP | 1261222 | 11/2002 |
| EP | 1392074 | 2/2004 |
| EP | 1441473 | 7/2004 |
| EP | 1478203 | 11/2004 |
| EP | 1511245 | 3/2005 |
| EP | 1557968 | 7/2005 |
| EP | 1212853 | 8/2005 |
| EP | 1599063 | 11/2005 |
| EP | 1605724 | 12/2005 |
| EP | 1684538 | 1/2006 |
| EP | 1641189 | 3/2006 |
| JP | 06-013959 | 1/1994 |
| JP | 06-121001 | 4/1994 |
| JP | 09-055693 | 2/1997 |
| JP | 09-186704 | 7/1997 |
| JP | 09-327072 | 12/1997 |
| JP | 11-177621 | 7/1999 |
| JP | 11-215192 | 8/1999 |
| JP | 11-308671 | 11/1999 |
| JP | 11331949 | 11/1999 |
| JP | 2000032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2001-522557 | 11/2001 |
| JP | 2001522557 | 11/2001 |
| JP | 2002501695 | 1/2002 |
| JP | 2002064589 | 2/2002 |
| JP | 2002135231 | 5/2002 |
| JP | 2002-374321 | 12/2002 |
| JP | 2003-008635 | 1/2003 |
| JP | 2003-504942 | 2/2003 |
| JP | 2003504942 | 2/2003 |
| JP | 2003504968 | 2/2003 |
| JP | 2003078480 | 3/2003 |
| JP | 2003-116172 | 4/2003 |
| JP | 2003-174470 | 6/2003 |
| JP | 2003-333661 | 11/2003 |
| JP | 2004-128967 | 4/2004 |
| JP | 2004-312771 | 11/2004 |
| JP | 2004-320165 | 11/2004 |
| JP | 2004-343258 | 12/2004 |
| JP | 2004349884 | 12/2004 |
| JP | 2005500761 | 1/2005 |
| JP | 2005-072634 | 3/2005 |
| JP | 2005510950 | 4/2005 |
| JP | 2005-517369 | 6/2005 |
| JP | 2005522923 | 7/2005 |
| JP | 2005-217743 | 8/2005 |
| JP | 2005-525066 | 8/2005 |
| JP | 2005-525720 | 8/2005 |
| JP | 2005525066 | 8/2005 |
| JP | 2005525720 | 8/2005 |
| JP | 2005-236988 | 9/2005 |
| JP | 2005-237013 | 9/2005 |
| JP | 2005-244958 | 9/2005 |
| JP | 2005-278167 | 10/2005 |

(56) References Cited

FOREIGN PATENT DOCUMENTS

| | | |
|---|---|---|
| JP | 2005-536168 | 11/2005 |
| JP | 2005-539462 | 12/2005 |
| JP | 2006-014372 | 1/2006 |
| JP | 2006-020044 | 1/2006 |
| JP | 2006-025437 | 1/2006 |
| JP | 2006-505998 | 2/2006 |
| JP | 2006-352705 | 12/2006 |
| JP | 2007-503155 | 2/2007 |
| JP | 2007-508749 | 4/2007 |
| JP | 2007536790 | 12/2007 |
| JP | 2008-509582 | 3/2008 |
| JP | 2008-510424 | 4/2008 |
| JP | 2009-284532 | 12/2009 |
| KR | 1020010111634 | 12/2001 |
| KR | 1020010111637 | 12/2001 |
| KR | 1020020077817 | 10/2002 |
| KR | 1020020096900 | 12/2002 |
| KR | 1020030081836 | 10/2003 |
| KR | 1020040048675 | 6/2004 |
| KR | 10-2004-0058638 | 7/2004 |
| KR | 1020040064867 | 7/2004 |
| KR | 1020040089937 | 10/2004 |
| KR | 10-2005-0019945 | 3/2005 |
| KR | 10-2005-0046305 | 5/2005 |
| KR | 10-2005-0078635 | 8/2005 |
| KR | 10-2005-0078636 | 8/2005 |
| KR | 10-2005-0078640 | 8/2005 |
| KR | 1020050078640 | 8/2005 |
| KR | 10-2005-0110533 | 11/2005 |
| KR | 10-2005-0119054 | 12/2005 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2263415 | 10/2005 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 586283 | 5/2004 |
| TW | 589818 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | I242951 | 11/2005 |
| TW | I253824 | 4/2006 |
| TW | 280755 | 5/2007 |
| WO | 99/60729 | 11/1999 |
| WO | 99/63713 | 12/1999 |
| WO | 01/20924 | 3/2001 |
| WO | 0120924 | 3/2001 |
| WO | 01/37473 | 5/2001 |
| WO | 0193462 | 12/2001 |
| WO | 02/39697 | 5/2002 |
| WO | 02/39760 | 5/2002 |
| WO | 02/043403 | 5/2002 |
| WO | 02/047417 | 6/2002 |
| WO | 02/075442 | 9/2002 |
| WO | 03/007636 | 1/2003 |
| WO | 03/017691 | 2/2003 |
| WO | 03/043259 | 5/2003 |
| WO | 03/047155 | 6/2003 |
| WO | 03/056723 | 7/2003 |
| WO | 03/096571 | 11/2003 |
| WO | 2004/030393 | 4/2004 |
| WO | 2004/034656 | 4/2004 |
| WO | 2004030392 | 4/2004 |
| WO | 2004/045234 | 5/2004 |
| WO | 2004/089030 | 10/2004 |
| WO | 2004/091130 | 10/2004 |
| WO | 2004/100598 | 11/2004 |
| WO | 2004/102901 | 11/2004 |
| WO | 2005/006660 | 1/2005 |
| WO | 2005/018144 | 2/2005 |
| WO | 2005/018269 | 2/2005 |
| WO | 2005/034418 | 4/2005 |
| WO | 2005/036917 | 4/2005 |
| WO | 2005/039134 | 4/2005 |
| WO | 2005/048616 | 5/2005 |
| WO | 2005050918 | 6/2005 |
| WO | 2005055472 | 6/2005 |
| WO | 2005/072073 | 8/2005 |
| WO | 2005/074312 | 8/2005 |
| WO | 2005/079021 | 8/2005 |
| WO | 2005078967 | 8/2005 |
| WO | WO 2005/071887 A1 * | 8/2005 |
| WO | 2005/088886 | 9/2005 |
| WO | 2005/099125 | 10/2005 |
| WO | 2005/101738 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005/125125 | 12/2005 |
| WO | 2005125020 | 12/2005 |
| WO | 2006/011953 | 2/2006 |
| WO | 2006/012946 | 2/2006 |
| WO | 2006/033552 | 3/2006 |
| WO | 2007/066883 | 6/2007 |
| WO | 2007/078155 | 7/2007 |
| WO | 2007/095966 | 8/2007 |
| WO | 2007091831 | 8/2007 |

OTHER PUBLICATIONS

Qualcomm, "Need for MAC-hs segmentation mechanism," R2-020769, 3GPP TSG-RAN WG2 meeting #28, Apr. 2002.

Motorola et al., "MAC-e/es header and functional split," R2-042360, 3GPP TSG RAN WG2 Meeting#45, Nov. 2004.

Ericsson, "User plane protocol enhancements," R2-052749, TSG RAN WG2 Meeting #48bis, Oct. 2005.

LG Electronics Inc., "MAC Enhancement," R2-060561, 3GPP TSG RAN WG2 #51, Feb. 2006.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.

LG Electronics Inc., "UE State Transition in LTE_ACTIVE," R2-061002, 3GPP TSG RAN WG2 #52, Mar. 2006.

Ericsson, "Solution for sending NAS together with RRC connection request," R2-071817, 3GPP TSG RAN WG2#58, May 2007.

LG Electronics Inc., "Default SRB for initial access," R2-061958, 3GPP TSG RAN WG2 LTE Ad-hoc, Jun. 2006.

IPWireless, "Layer 2 functions for LTE," R2-052377, 3GPP TSG RAN WG2 #48bis, Oct. 2005.

LG Electronics Inc., "MAC Architecture of LTE," R2-060105, 3GPP TSG RAN WG2 #50, Jan. 2006.

LG Electronics Inc., "HARQ and ARQ Operation," R2-060563, 3GPP TSG RAN WG2 #51, Feb. 2006.

LG Electronics Inc., "Discussion on RLC PDU Structure," R2-070721, 3GPP TSG RAN WG2 #57, Feb. 2007.

3rd Generation Partnership Project (3GPP), "Technical Specification Group Radio Access Network; Introduction of the Multimedia Broadcast Multicast Service(MBMS) in the Radio Access Network (RAN); Stage 2 (Release 6)", 3GPP TS 25.346 V6.7.0, Dec. 2005.

Ericsson, "E-UTRA Random Access," TSG RAN WG1 #43, R1-051445, Nov. 7, 2005.

M. Haardt et al., "The TD-CDMA Based UTRA TDD Mode," IEEE Journal on Selected Areas in Communications, vol. 18, No. 8, pp. 1375-1385, Aug. 2000.

Siemens, "States in E-UTRAN," R2-052051, 3GPP TSG RAN WG RAN2#48, Aug. 2005.

China Mobile Communications Co., "RRC States Analysis in LTE," R2-052140, 3GPP TSG RAN WG2 #48, Aug. 2005.

(56) References Cited

OTHER PUBLICATIONS

Qualcomm Europe, "Signaling optimization for E-UTRAN," R2-052407, 3GPP TSG RAN WG 2 meeting #48-bis, Oct. 2005.
Panasonic, "E-UTRA Transport and Logical Channels," R2-052860, 3GPP TSG RAN WG2#49, Nov. 2005.
LG Electronics, Inc., "Framing in the MAC Entity," 3GPP TSG RAN WG2 #52, R2-061012, Mar. 27, 2006.
LG Electronics, Inc., "HARQ and ARQ Operation," 3GPP TSG RAN WG2 #50, R2-060106, Jan. 9, 2006.
Huawei, "Further Considerations on Multiplexing Method of Shared Control Channel in Uplink Single-Carrier FDMA," 3GPP TSG RAN WG1 #43, R1-051430, Nov. 7, 2005.
NTT Docomo, et al., "Multiplexing Method of Shared Control Channel in Uplink Single-Carrier FDMA Radio Access," 3GPP TSG RAN WG1 #42bis, R1-051143, Oct. 10, 2005.
Philips, "Evolving Paging Indicators for LTE," 3GPP TSG RAN WG2 #49, R2-052985, Nov. 7, 2005.
Sarkar, S., et al., "Common-Channel Soft Handoff in CDMA2000—The Paging Channel," IEEE Transactions on Microwave Theory and Techniques, Jun. 2000, vol. 48, Issue 6, pp. 938-950.
NTT Docomo, et al., "Paging Channel Structure for E-UTRA Downlink," 3GPP TSG RAN WG1 LTE, R1-060034, Jan. 23, 2006.
Motorola, "Paging Channel Design for E-UTRA," 3GPP TSG RAN1 LTE, R1-061712, Jun. 27, 2006.
LG Electronics Inc., "UE state transition in LTE_ACTIVE," 3GPP TSG RAN WG2#52, R2-061002, Mar. 27, 2006.
Ericsson, "LTE States in E-UTRAN," 3GPP TSG RAN WG2 Meeting #48bis, R2-052425, Oct. 10, 2005.
United States Patent and Trademark Office U.S. Appl. No. 12/159,981, Office Action dated Jan. 18, 2013, 11 pages.
Korean Intellectual Property Office Application Serial No. 10-2006-0088273, Office Action dated Sep. 17, 2012, 3 pages.
Korean Intellectual Property Office Application Serial No. 10-2006-0088274, Notice of Allowance dated Sep. 25, 2012, 2 pages.
European Patent Office Application Serial No. 07708817.7, Search Report dated Sep. 25, 2012, 8 pages.
Korean Intellectual Property Office Application Serial No. 10-2006-0107103, Notice of Allowance dated Sep. 13, 2012, 2 pages.
United States Patent and Trademark Office U.S. Appl. No. 12/160,099, Office Action dated Sep. 14, 2012, 15 pages.
European Patent Office Application Serial No. 07745614.3, Search Report dated Oct. 1, 2012, 10 pages.
Korean Intellectual Property Office Application Serial No. 10-2007-0000936, Notice of Allowance dated Sep. 20, 2012, 2 pages.
European Patent Office Application Serial No. 07708765.8, Search Report dated Sep. 28, 2012, 10 pages.
Qualcomm, "Max number of MAC-hs header extensions", R2-042023, 3GPP TSG RAN WG2 meeting #44, Oct. 2004, 5 pages.
European Patent Office Application Serial No. 07708815.1, Search Report dated Sep. 24, 2012, 9 pages.
United States Patent and Trademark Office U.S. Appl. No. 12/305,920, Final Office Action dated Oct. 4, 2012, 20 pages.
United States Patent and Trademark Office U.S. Appl. No. 13/410,185, Office Action dated Oct. 10, 2012, 11 pages.
United States Patent and Trademark Office U.S. Appl. No. 13/410,221, Office Action dated Oct. 15, 2012, 12 pages.
European Patent Office Application Serial No. 07700865.4, Search Report dated Nov. 8, 2012, 6 pages.
Qualcomm Europe, "Access procedure for LTE", R2-060362, 3GPP TSG RAN WG2 LTE, Feb. 2006, 4 pages, XP50130362.
European Patent Office Application Serial No. 07700868.8, Office Action dated Nov. 2, 2012, 7 pages.
Philips, Random Access considerations and discussion of L1 questions from RAN2., R1-060143, 3GPP TSG RAN WG1 LTE Adhoc, Jan. 2006, 4 pages, XP50417365.
RAN2, "LTE L1 related questions to RAN1", R1-060061 (R2-060144 Questions to RAN1—3GPP TSG-RAN2 Meeting @50, Jan. 2006), 3GPP TSG RAN WG1 LTE Ad Hoc Meeting, Jan. 2006, 4 pages, XP50491669.

Ericsson, "Initial, Random Access and Identity Handling", R2-060592, TSG RAN WG2 Meeting #51, Feb. 2006, 8 pages, XP50130549.
European Patent Office Application Serial No. 11004852.7, Office Action dated Nov. 5, 2012, 9 pages.
European Patent Office Application Serial No. 07747053.2, Search Report dated Nov. 13, 2012, 6 pages.
Taiwan Intellectual Property Office Application Serial No. 096104339, Office Action dated Dec. 6, 2012, 6 pages.
United States Patent and Trademark Office U.S. Appl. No. 12/305,916, Office Action dated Dec. 18, 2012, 12 pages.
Korean Intellectual Property Office Application Serial No. 10-2006-0107104, Office Action dated Dec. 20, 2012, 15 pages.
European Patent Office Application Serial No. 07708804.5, Search Report dated Nov. 6, 2012, 6 pages.
3rd Generation Partnership Project (3GPP), "Technical Specification Group GERAN; Packet-switched handover for GERAN A/Gb mode; Stage 2 (Release 6)", 3GPP TS 43.129 V6.6.0, Jan. 2006, 70 pages, XP50378285 (Relevant portions: paragraphs 5.1.4.1 through 5.1.4.2).
European Patent Office Application Serial No. 06812408.0, Search Report dated Nov. 22, 2012, 6 pages.
European Patent Office Application Serial No. 11001176.4, Office Action dated Oct. 24, 2012, 8 pages.
Korean Intellectual Property Office Application Serial No. 10-2006-0085190, Office Action dated Feb. 25, 2013, 5 pages.
European Patent Office Application Serial No. 7700867.0, Search Report dated Feb. 27, 2013, 9 pages.
European Patent Office Application Serial No. 7700858.9, Search Report dated Mar. 5, 2013, 6 pages.
3rd Generation Partnership Project (3GPP); "Technical Specification Group Radio Access Network; Radio Interface Protocol Architecture (Release 6)," 3GPP TS 25.301 V6.4.0, Sep. 2005, 48 pages.
European Patent Office Application Serial No. 07700814.2, Office Action dated Feb. 18, 2013, 5 pages.
Korean Intellectual Property Office Application Serial No. 10-2006-0088273, Notice of Allowance dated Mar. 28, 2013, 5 pages.
Taiwan Intellectual Property Office Application Serial No. 096100583, Office Action dated Mar. 18, 2013, 8 pages.
European Patent Office Application Serial No. 07747052.4, Search Report dated Mar. 14, 2013, 8 pages.
Korean Intellectual Property Office Application Serial No. 10-2006-0107104, Notice of Allowance dated Apr. 12, 2013, 2 pages.
European Patent Office Application Serial No. 07700867.0, Search Report dated Feb. 27, 2013, 9 pages.
Korean Intellectual Property Office Application Serial No. 10-2007-0000097, Notice of Allowance dated Feb. 6, 2013, 2 pages.
Taiwan Intellectual Property Office Application Serial No. 96104517 Office Action dated Jan. 24, 2013, 10 pages.
European Patent Office Application Serial No. 07746856.9, Search Report dated Jan. 31, 2013, 8 pages.
European Patent Office Application Serial No. 07747056.5, Search Report dated Feb. 14, 2013, 7 pages.
LG Electronics Inc., "UE state transition in LTE_ACTIVE," 3GPP TSG-RAN WG2 #52, R2-061002, Mar. 2006, 3 pages.
Nortel, "Proposal for the Uplink Multiple Access Scheme for E-UTRA," 3GPP TSG RAN WG1 #42bis, R1-051165, Oct. 2005, 18 pages.
Japan Patent Office Application Serial No. 2011-219329, Office Action dated Jun. 4, 2013, 3 pages.
NTT DoCoMo, INc., "Summary (with revision marks) of email discussion point 3: Initial access procedure: C-RNTI and HARQ," 3GPP TSG RAN WG2 #56bis, Tdoc-R2-070338, 9 pages.
IPWireless, et al., "RACH access optimisation," 3GPP TSG RAN WG2 #59, R2-073186, Jun. 2007, 6 pages.
European Patent Office Application Serial No. 13163775.3, Search Report dated May 27, 2013, 6 pages.
Taiwan Intellectual Property Office Application Serial No. 096104339, Office Action dated May 30, 2013, 5 pages.

* cited by examiner

FIG. 1

Prior Art

FIG. 2

Prior Art

FIG. 3

Prior Art

FIG. 4

Prior Art

FIG. 5

Prior Art

Fig. 6

DL : downlink
UL : uplink

METHOD FOR SUPPORTING QUALITY OF MULTIMEDIA BROADCAST MULTICAST SERVICE (MBMS) IN MOBILE COMMUNICATIONS SYSTEM AND TERMINAL THEREOF

CROSS-REFERENCE TO RELATED APPLICATIONS

This application is the National Stage filing under 35 U.S.C. §371 of International Application No. PCT/KR2007/003021, filed on Jun. 21, 2007, which claims the benefit of earlier filing date and right of priority to Korean Application No. 10-2007-0042094, filed on Apr. 30, 2007, and also claims the benefit of U.S. Provisional Application Ser. No. 60/815,722, filed on Jun. 21, 2006.

DISCLOSURE OF INVENTION

Technical Solution

The present disclosure relates to Multimedia Broadcast Multicast Service (MBMS) in an E-UMTS (Evolved Universal Mobile Telecommunications System) and, more particularly, to a method for supporting quality of MBMS in mobile communications system and terminal thereof.

Figure 1:
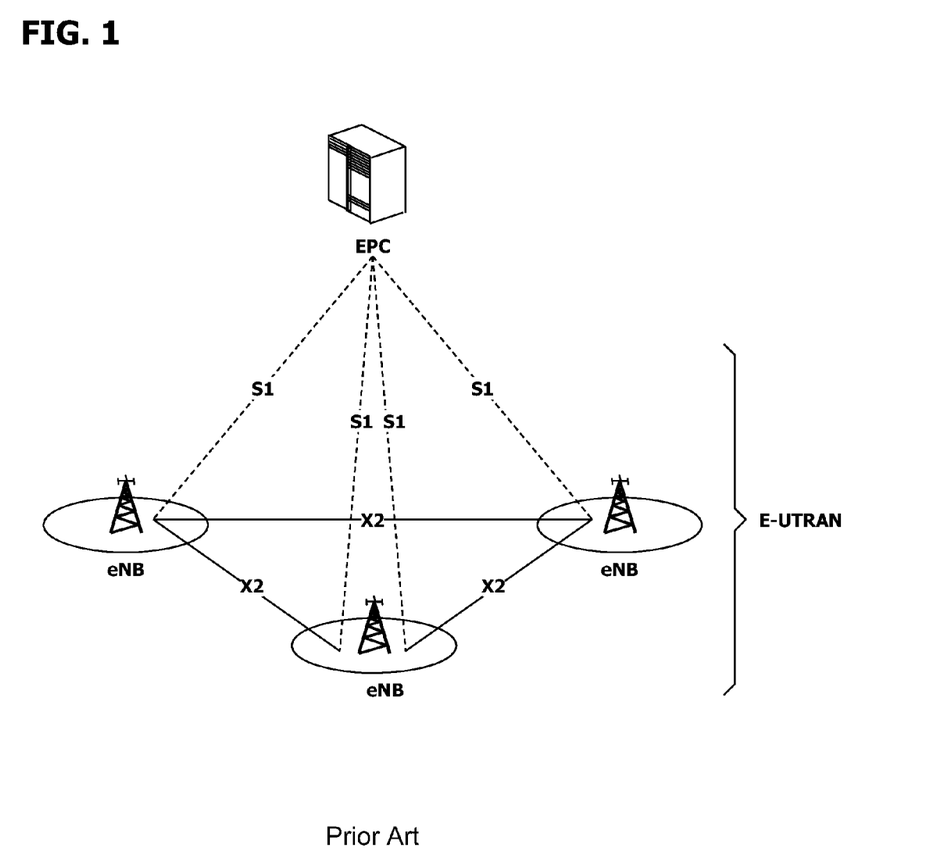
FIG. 1 shows an exemplary network structure of the E-UMTS.

FIG. 1 is a network structure of the E-UMTS, a mobile communication system applicable to the related art and the present disclosure.

The E-UMTS system has been evolved from the UMTS system, for which the 3GPP is proceeding with the preparation of the basic specifications applicable thereto. The E-UMTS system may be referred to as an LTE (Long Term Evolution) system.

With reference to FIG. 1, the E-UMTS network includes an E-UTRAN and an EPC (Evolved Packet Core). An interface between the E-UTRAN and the EPC can be used. An S1 interface can be used between the eNodeBs and the EPC. The eNodeBs are connected with each other through an X2 interface, and the X2 interface may be present between adjacent eNodeBs in a meshed network structure.

Figure 2:
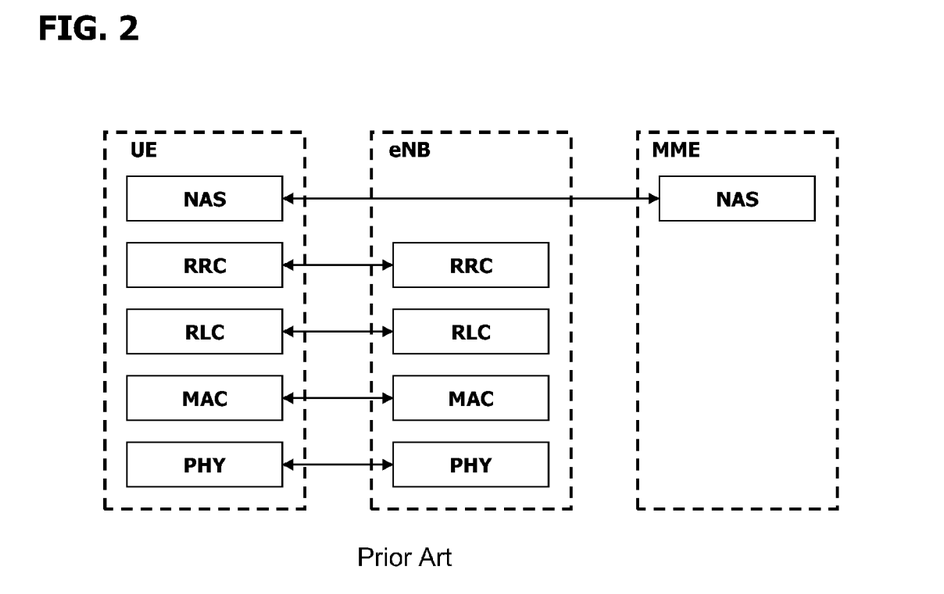
FIG. 2 shows an exemplary structure of the control plane of the radio access interface protocol for the E-UMTS.
Figure 3:
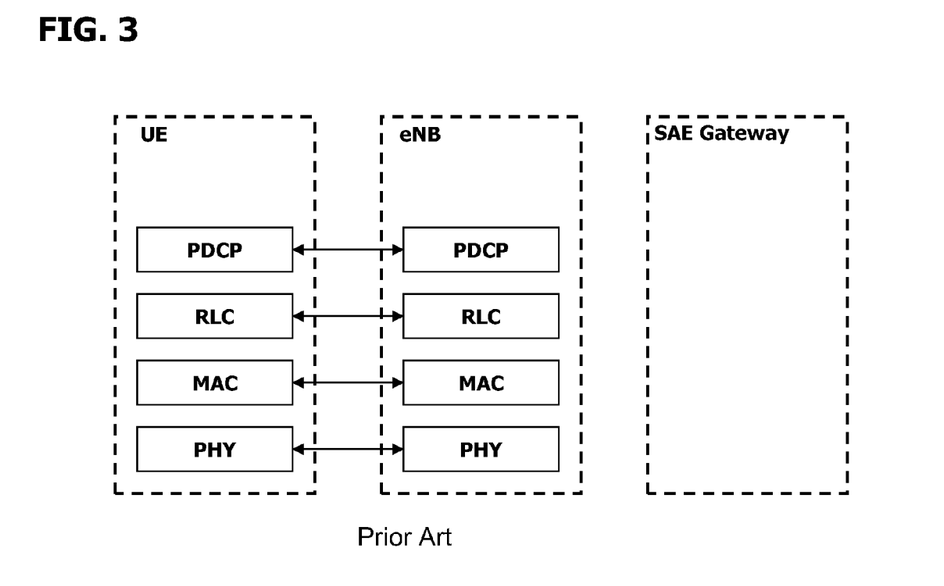
FIG. 3 shows an exemplary structure of the user plane of the radio access interface protocol for the E-UMTS.

FIGS. 2 and 3 illustrate a structure of the radio access interface protocol for the E-UMTS.

The radio access interface protocol has horizontal layers including a physical layer, a data link layer and a network layer, and has vertical planes including a user plane for transmitting data information and a control plane for transmitting control signals.

The protocol layers can be divided into a first layer (L1), a second layer (L2) and a third layer (L3) based upon the three lower layers of an open system interconnection (OSI) standard model that is well-known in the art of communication systems.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the second layer provides a service to a radio link control (RLC) layer, an upper layer, via a logical channel. The RLC layer of the second layer supports a reliable data transmission. The function of the RLC layer can be implemented as a function block within the MAC layer, and in this case, the RLC layer may not be present. A PDCP (Packet Date Convergence Protocol) layer of the second layer performs a header compression function for reducing unnecessary control information so that data transmitted by using IP packets such as IPv4 or IPv6 can be effectively transmitted via a radio interface with a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN. A Non-Access Stratum (NAS) layer located on the most upper portion of the RRC layer performs functions such as a SAE (System Architecture Evolution) bearer management, an authentication, an idle mode mobility handling, a paging origination in LTE_IDLE, or a security control for the signalling between aGW and UE, etc.

Downlink transport channels for transmitting data from the network to the terminal, include a broadcast channel (BCH) for transmitting system information and a downlink shared channel (SCH) for transmitting the user traffic or the control message. Downlink multicast, traffic of a broadcast service or a control message can be transmitted through the downlink SCH or through a separate downlink multicast channel (MCH).

Uplink transport channels for transmitting data from the terminal to the network include a random access channel (RACH) for transmitting an initial control message and an uplink SCH for transmitting the user traffic and the control message.

Logical channels located above the transport channels and mapped to the transport channels, include a broadcast control channel (BCCH), a paging control channel (PCCH), a common control channel (CCCH), a multicast control channel and a multicast traffic channel (MTCH).

Figure 4:
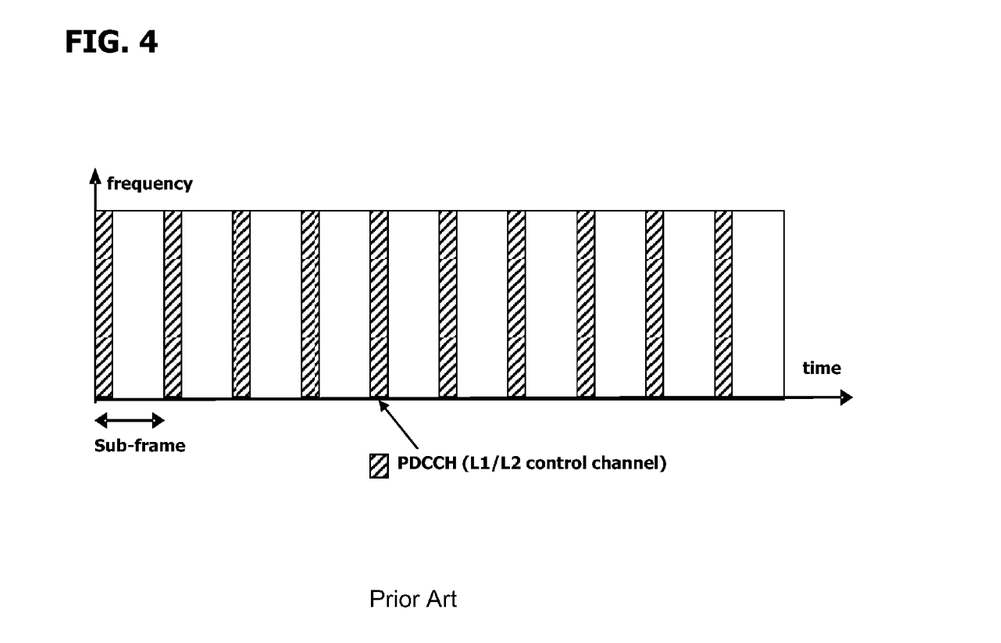
FIG. 4 shows an exemplary structure of the physical channel.

FIG. 4 shows an exemplary structure of the physical channel. The physical channel transfers signalling and data between the UE Layer 1 (L1) and the eNB Layer 1 (L1). As shown in FIG. 3, the physical channel transfers the signalling and the data, which consists of a plurality of sub-carriers in frequency and a plurality of symbols in time (i.e., 6 or 7 symbols constitute one sub-frame which is 0.5 ms in length). One sub-frame consists of a plurality of resource blocks and one resource block comprises a plurality of symbols and a plurality of sub-carriers. One sub-frame is 0.5 ms and TTI (Transmission Time Interval) which is a unit time for data transmission is 1 ms corresponded to two sub-frames. The particular symbol(s) of the sub-frame (e.g. the first symbol of the sub-frame) can be used for the L1/L2 control channel. The L1/L2 control channel carries L1/L2 control information (signalling).

A Random Access Channel of a WCDMA will be described in more detail as follows.

The Random Access Channel (RACH) is used to transfer a short length data on an uplink, and some of the RRC message (i.e., RRC Connection Request Message, Cell Update Message, URA Update Message) is transmitted via the RACH. The RACH is mapped to a Common Control Channel (CCCH), a Dedicated Control Channel (DCCH) and a Dedicated Traffic Channel (DTCH), and then the RACH is mapped to a Physical Random Access Channel.

Figure 5:
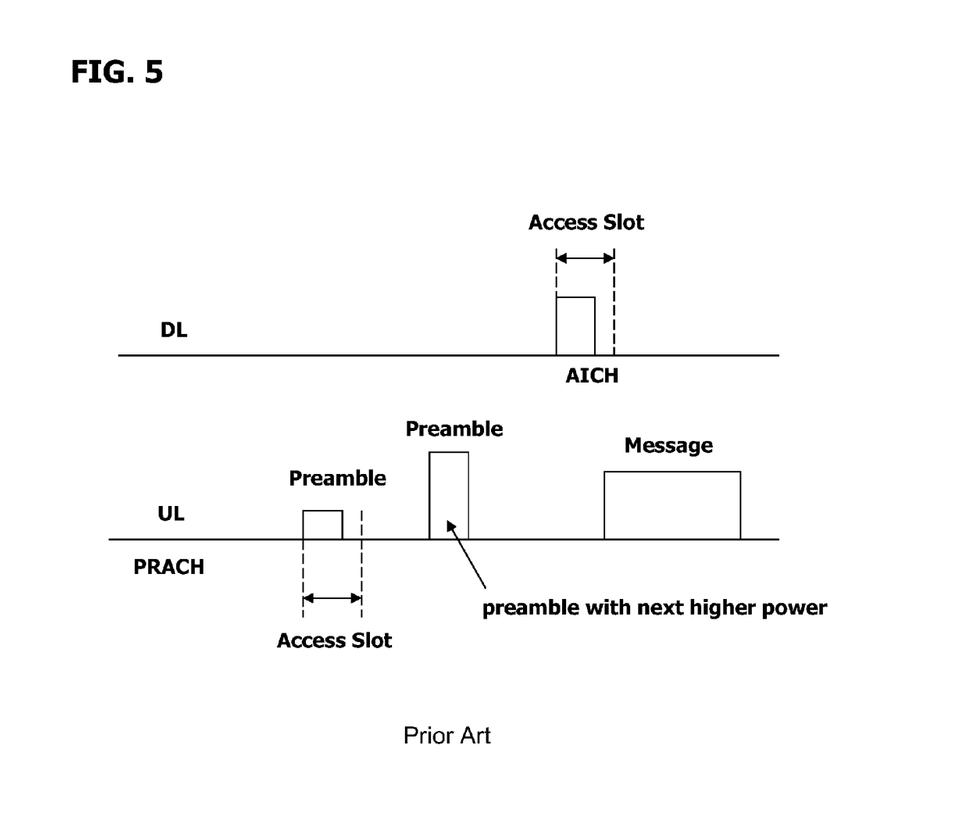
FIG. 5 shows an exemplary diagram illustrating a transmission method of a physical channel PRACH in accordance with the related art.

FIG. 5 is a diagram illustrating a transmission method of a physical channel PRACH in accordance with the related art. The PRACH, which is an uplink physical channel, is divided into a preamble part and a message part. The preamble part is used to properly control a transmission power for a message transmission (i.e., a power ramping function] and is used to avoid a collision between multiple terminals. The message part is used to transmit a MAC PDU that was transferred from the MAC to the Physical channel.

When the MAC of the terminal instructs a PRACH transmission to the physical layer of the terminal, the physical layer of the terminal first selects one access slot and one (preamble) signature, and transmits the preamble on the PRACH to an uplink. Here, the preamble is transmitted within a particular the length of access slot duration (e.g., 1.33 ms). One signature is selected among the 16 different signatures within a first certain length of the access slot, and it is transmitted.

If the preamble is transmitted from the terminal, a base station transmits a response signal via an Acquisition indicator channel (AICH) which is a downlink physical channel. The AICH, in response to the preamble, transmits a signature that was selected within the first certain length of the access slot. Here, the base station transmits an ACK response or a NACK response to the terminal by means of the transmitted signature from the AICH.

If the ACK response is received, the terminal transmits a 10 ms or 20 ms length of the message part using an OVSF code that correspond with the transmitted signature. If the NACK response is received, the MAC of the terminal instructs the PRACH transmission again to the physical layer of the terminal after a certain time period. Also, if no AICH is received with respect to the transmitted preamble, the terminal transmits a new preamble with a higher power compared to that used for the previous preamble after a predetermined access slot.

Hereafter, a Multimedia Broadcast/Multicast Service (MBMS or "MBMS service") will be described. MBMS refers to a method of providing streaming or background services to a plurality of UEs using a downlink-dedicated MBMS radio bearer that utilizes at least one of a point-to-multipoint radio bearer and a point-to-point radio bearer. One MBMS service includes one or more sessions and MBMS data is transmitted to the plurality of terminals (i.e. UEs) through the MBMS radio bearer only while the session is ongoing.

A MBMS may be carried out in a broadcast mode or a multicast mode. The broadcast mode is for transmitting multimedia data to all UEs within a broadcast area, for example the region where the broadcast is available. The multicast mode is for transmitting multimedia data to a specific UE group within a multicast area, for example the region where the multicast service is available.

The UTRAN provides the MBMS service to the UEs using the RB. RBs used by the UTRAN can be classified as a point-to-point RB or a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel) or SCCPCH (Secondary Common Control Physical Channel). The point-to-multipoint RB is a uni-directional downlink RB, including a logical channel MTCH (MBMS Traffic Channel), a transport channel FACH (Forward Access Channel), and the physical channel SCCPCH. The logical channel MTCH is configured for each MBMS service provided to one cell and used to transmit user plane data of a specific MBMS service to multiple UEs.

In the related art, for non-MBMS service, when a base station sets a dedicate radio bearer with a terminal, the base station may control an amount of radio resource used for transmitting a data blocks because the base station can receive information related to current reception state (status or condition) from the terminal. However, for MBMS service, it is somewhat impossible to allocate radio resource efficiently because the base station transmits/receives data block(s) not to/from a single terminal but to/from a plurality of terminals. For instance, in the MBMS, even if the base station sets best possible radio resource to transmit the data block for a particular terminal, this may cause degradation of quality for the MBMS service to other terminals. Thus, in the related art, there is the disadvantage of supporting quality of MBMS service in efficient manner.

The present disclosure has been developed in order to solve the above described problems of the related art. As a result, the present disclosure may provide a method for supporting quality of Multimedia Broadcast Multicast Service (MBMS) while using minimum possible radio resource(s) of a cell.

Accordingly, the present disclosure may be directed to a method of effectively utilizing of an uplink radio resource while supporting a quality of the MBMS service (i.e., point to multipoint service) to each terminal that is subscribed to the MBMS service, and this present disclosure would substantially obviates one or more problems due to limitations and disadvantages of the related art.

To implement at least the above feature in whole or in parts, the present disclosure may provide a method of providing a MBMS in a wireless communications system, comprising; requesting, to at least one terminal, a measurement of a reception state with respect to a particular MBMS service by the base station, and allocating an uplink radio resource thereof; the terminal transmits reception state information with respect to the particular MBMS service through the allocated uplink radio resource to the base station; the base station set or adjusts a radio configuration parameter using the received reception state information.

The present disclosure may also provide a method of providing a Multimedia Multicast Broadcast Service (MBMS) in a wireless communications system, the method comprising: receiving a feedback configuration parameter from a base station; receiving a MBMS service data; and transmitting feedback information using the received feedback configuration parameter.

The present disclosure may also provide a method of providing a multimedia multicast broadcast service (MBMS) in a wireless communications system, the method comprising: transmitting a feedback configuration parameter to at least one terminal that is subscribed in a MBMS service; transmitting a MBMS service data to the at least one terminal; and receiving feedback information from the at lest one terminal that uses the feedback configuration parameter for a transmission of the feedback information.

The present disclosure may also provide a mobile terminal for providing a Multimedia Multicast Broadcast Service (MBMS) in a wireless communications system, the mobile terminal comprising: a transceiver adapted to transmit or receive a data; a memory adapted to store the data transmitted or received via the transceiver or from an external source; and a processor cooperating with the transceiver and the memory and adapted to perform the steps of, receiving a feedback configuration parameter from a base station; receiving a MBMS service data; and transmitting feedback information using the received feedback configuration parameter.

Additional features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

One aspect of the present disclosure is the recognition by the present inventors regarding the problems and drawbacks of the related art described above and explained in more detail hereafter. Based upon such recognition, the features of the present disclosure have been developed.

Although the present disclosure is shown to be implemented in a mobile communication system, such as a UMTS developed under 3GPP specifications, the present disclosure can also be applied to other communication systems operating in conformity with different standards and specifications.

As network technology continues to develop, it is foreseen that RNCs may no longer be necessary in future networks, because Node Bs with enhanced capabilities, or other types of network entities (e.g. so-called Access Gateways) may handle the operations performed by currently existing RNCs. Such long-term evolution (LTE) issues further support the need to develop improved radio admission control techniques to be used in admitting new terminals (or establishing new user links) and supporting newly developing enhanced services for a greater number of terminals being managed by the network.

MBMS service is provided by transmitting same data streaming to a plurality of terminals through a single radio resource setting. For example, if there is one TV broadcast service, and if there are plurality of terminals that wish to receive such TV broadcast service within a particular cell, the base station may save radio resource by assigning or allocating single radio resource for all terminals, rather than assigning different radio resources for each terminal.

Figure 6:
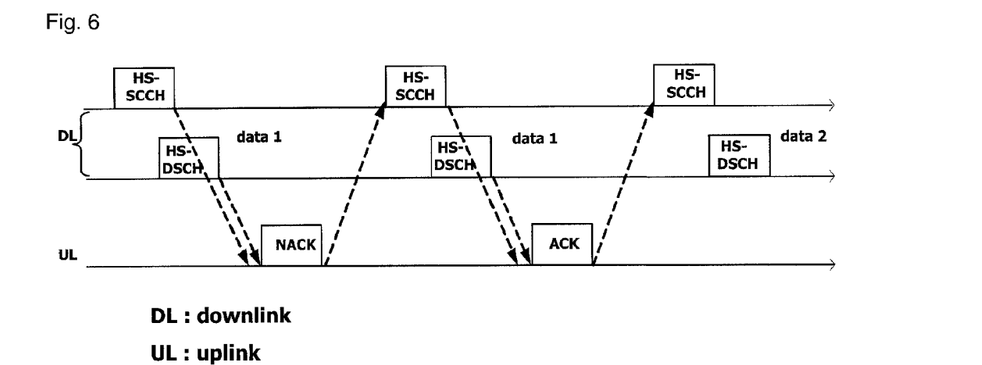
FIG. 6 shows an exemplary diagram illustrating HARQ processing applied in a downlink physical layer of wireless packet communications system according to the present disclosure.

FIG. 6 shows an exemplary diagram illustrating HARQ processing applied in a downlink physical layer of wireless packet communications system according to the present disclosure.

As referred to FIG. 6, a base station may determine a terminal (which will receive a packet) and a packet format (i.e. coding rate, modulation scheme, amount of data, etc), which will be transmitted to the terminal. Then, the base station may notify such information to the terminal through a downlink control channel (HS-SCCH), and transmits a corresponding data packet (HS-DSCH) at corresponding time period. The terminal will acknowledge the packet format and transmission time by receiving the HS-SCCH, and may receive the corresponding data packet (HS-DSCH) according to the acknowledged packet format and transmission time. After receiving the data packet, the terminal may transmit an ACK signal to the base station if the data packet is successfully decoded by the terminal. By receiving the ACK signal from the terminal, the base station may assume that the data packet transmission to the corresponding terminal is successfully performed, and may go on to perform next data packet transmission. The terminal may transmit a NACK signal to the base station if the data packet is not successfully decoded by the terminal. Then, by receiving the NACK signal from the terminal, the base station may assume that the data packet transmission to the corresponding terminal is not successfully performed, and may retransmit same packet data at proper time with the same packet format or new packet format. Here, the terminal may retry to decode the data packet using various combinations of the retransmitted packet data with previously received but not successful decoded packet data. A channel used for transmitting the ACK/NACK signal may be called as an ACK/NACK channel.

One of aspect of present disclosure is to provide a method for supporting quality of MBMS service. Namely, when particular MBMS service is provided from a base station to a plurality of terminals, a quality of the MBMS service, which is provided to each terminal, needs to be better than at least a certain reference quality. Therefore, according to the present disclosure, the base station may request at least one terminal to measure a reception state (status or condition) with respect to a particular MBMS service, and then may request to generate information (i.e., feedback information) related to the measured reception state. Also, the base station may allocate an uplink radio resource(s) that will be used for transmitting the measured reception state information (i.e., feedback information) by the terminal. The base station may receive each reception state information from each terminal using the allocated uplink radio resource(s), and then may set or control a radio configuration parameter (i.e., code, power, frequency, time, etc) of cell (which is managed by the base station) using the received reception state information from each terminal.

Here, the uplink radio resource(s) (i.e., RACH resource, ACK/NACK channel resource, CQI resource, etc) may be used for transmitting the reception state information by at least one terminal. The uplink radio resource(s) may not be designated by the each terminal. Instead, such radio resource(s) may commonly used for at least one terminal that receives a particular MBMS service. Namely, the uplink radio resource(s) may be designated (allocated or assigned) per a MBMS service, not by the each terminal.

Particularly, a plurality of terminals that receive a MBMS service in a cell may transmit a large amount of reception state information to the base station, thereby causing a complexity and waste of an uplink radio resource(s). The present disclosure may be provided to solve such drawbacks. For example, if all of terminals that receive a particular MBMS service in a cell transmit reception state information for every certain time period, each terminal may need at least one radio resource block for transmitting each reception state information. As such, a large amount of the uplink radio resource(s) will be used as a number of the terminals increases. Also, if all of terminals that receive the particular MBMS service in the cell transmit reception state information to the base station, it will cause a collision (or contention) of the uplink radio resource access. Furthermore, because of this, it may be possible that some of terminal may not able to transmit the reception state information to the base station.

To solve this, the present disclosure may provide that the base station may transmit a request (instruction) to the terminal for transmitting information related to a reception state (status, condition) with respect to the MBMS service. Here, the request message is a message that instructs the terminal to measure a reception state with respect to the MBMS service, to generate reception state information based on the measured reception state, and to transmit the generated reception state information to the base station. The base station may transmit information related to an uplink radio resource(s) (or uplink radio resource information) with the request message. The uplink radio resource information may refer to information related to a radio resource that will be used for transmitting the reception state information with respect to the MBMS service by the terminal.

Also, when the terminal receives an instruction to measure a reception state with respect to the MBMS service from the base station, the terminal may measure the reception state with respect to the MBMS service according to the instruction. The terminal may transmit the measured reception state information to the base station if a certain condition (which may previously set) is met. Here, if the base station allocated an uplink radio resource(s) for transmitting the reception state information, each terminal may transmit the measured reception state information using the allocated uplink radio resource(s).

The present disclosure may also provide that the base station transmits a particular MBMS service data to at least one terminal. After the base station receives reception state information with respect to the MBMS service data from each terminal, the base station may perform a re-transmission of data block according to the reception state information.

With respect to each of the terminals receiving a particular MBMS service, in order to allow a response to be sent for the transmission/reception of the data block of the MBMS service (i.e., MBMS data block), the base station allocates a HARQ ACK/NACK channel with respect to the MBMS service, and the information related to the allocated HARQ ACK/NACK channel is transmitted to the terminal. Namely, the base station allocates the HARQ ACK/NACK channel commonly used by the terminals receiving the MBMS service, and receives a response from each terminal through such allocated HARQ ACK/NACK channel. Namely, because the HARQ ACK/NACK channel is allocated per each MBMS service and not per each terminal, the base station can effectively use the uplink radio resources.

Namely, for the terminal that received the particular MBMS service, during the procedure of receiving the data of the MBMS service, in case the MBMS service data is successfully received, or not successfully received, a response (ACK or NACK) is sent to the base station using the HARQ ACK/NACK channel allocated by the base station for the MBMS service.

Meanwhile, in most cases, each terminal can successfully receive the data block(s) of the MBMS service transmitted by the base station. Namely, the situation where each terminal fails to receive the data block(s) transmitted by the base station is rare. Thus, considering such characteristics of MBMS data block reception, congestion of uplink radio resources (in particular, congestion of HARQ ACK/NACK) may be prevented (or minimized) by the following method. Namely, in case the terminal successfully receives the MBMS service data block(s), a response (i.e., ACK) is not sent on the uplink, but a response (i.e., NACK) is sent on the uplink only in case the terminal does not successfully receive the MBMS service data block(s).

Also, after transmitting the data block of the particular MBMS service, the base station monitors the ACK/NACK channel allocated to the MBMS service. Here, if a NACK is received from the terminal in response to the data block through the ACK/NACK channel being monitored, the base station can determine whether such data block should be re-transmitted to the terminal. Also, the base station may adjust the radio environment establishment (set up) value based upon whether the NACK was received or not.

In most cases, each terminal can successfully receive the MBMS service data blocks transmitted by the base station. Namely, the case where each terminal fails to receive the data block transmitted by the base station is rare. Thus, by considering such reception characteristics of the data blocks of MBMS, congestion of the uplink radio resources (in particular, the congestion of HARQ ACK/NACK) may be prevented (or minimized), and its method is as follows. Namely, in case the MBMS service data block reception is successful, a response (i.e., ACK) is sent on the uplink, but in case the MBMS service data block reception is not successful, a response (i.e., NACK) is not sent on the uplink.

Also, after transmitting the data block of the particular MBMS service, the base station monitors the ACK.NACK channel allocated to the MBMS service. Here, if the base station does not receive an ACK (in response to the data block) from the terminal through the ACK/NACK channel being monitored, the base station can decide to retransmit the data block to the terminal. Also, the base station may adjust the radio environment establishment (set up) value according to whether the NACK is received or not.

Figure 7:
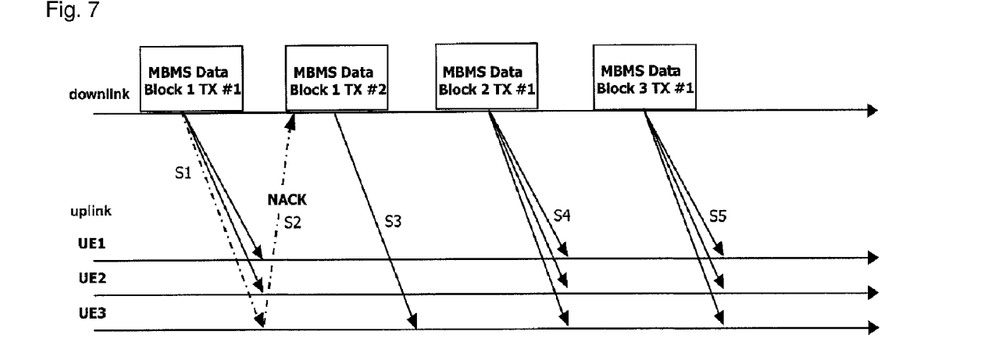
FIG. 7 shows an exemplary diagram illustrating a response through an ACK/NACK channels of each terminal with respect to MBMS data block transmitted by the base station that according to the present disclosure.

FIG. 7 shows an exemplary embodiment of the present disclosure, showing the responses through ACK/NACK channel of each terminal with respect to MBMS data blocks transmitted from a base station. In FIG. 7, when the base station transmits MBMS data, the terminals that can receive the MBMS service share and receive the MBMS data. However, in the example of FIG. 7, as for the terminals that receive the MBMS service from the base station, it is assumed that there are 3 terminals (i.e., terminal 1, terminal 2, terminal 3) merely for the sake of explanation. Also, in the example of FIG. 6, with respect to the MBMS data block 1 transmitted by the base station, it is assumed that terminal 1 and terminal 2 successfully receive such, but terminal 3 fails to receive it.

Referring to FIG. 7, the base station transmits (MBMS Data Block 1) to the terminals (terminal 1~terminal 3) through the downlink (S1). In the above step (S1), terminal 1 and terminal 2 successfully receive the MBMS data block 1, but terminal 3 fails to receive it. Thus, terminal 3 sends a response (i.e., NACK) to the base station, through the ACK/NACK channel allocated to the MBMS service, to inform that the reception of MBMS data block 1 was unsuccessful (reception failure). Meanwhile, terminal 1 and terminal 2 do not transmit a response (i.e., ACK) to the base station to inform that the reception of MBMS data block 1 was successful. This is to increase the efficiency of radio resources.

Through the above step (S2), the base station receives a NACK from terminal 3, and thus can know that terminal 3 did not receive MBMS data block 1. Thus, the base station re-transmits the MBMS data block 1 (S3).

Thereafter, the base station sequentially transits MBMS data block 2 and MBMS data block 3 to the terminals (S4 and S5). In the above step (S4 and S5), because each terminal (i.e., terminals 1~3) successfully received the MBMS data block 2 and the MBMS data block 3, a NACK as well as an ACK are not sent. Accordingly, because a NACK has not been received, the base station does not re-transmit the MBMS data block 2 and the MBMS data block 3 to the terminals.

Hereafter, another exemplary embodiment of the present disclosure will be explained.

An aspect of the present disclosure is to have a base station, which provides a particular MBMS service to the terminals, present a method of guaranteeing MBMS service quality to be above a certain level for the terminals.

To do so, the base station transmits data of a particular MBMS service, and upon receiving reception status information with respect to the data from the terminal, the radio environment establishment (set up) value used in transmitting MBMS service data may be adjusted.

In order to guarantee MBMS service quality of above a certain level to each terminal, the base station informs the terminal about the particular state (e.g., situation, condition, etc.) in which the reception status information (that is created or generated by each terminal) is to be transmitted to the base station. Also, with respect to each terminal, while the particular MBMS service is being received, if a particular state occurs, the corresponding reception status information is created (generated) and transmitted to the base station.

The particular state may indicate whether the reception quality becomes better or worse than a certain threshold value.

The particular state may indicate whether the number of data blocks not properly received by the terminal is greater than or less than a certain threshold value.

The particular state may indicate whether the ratio between the number of data blocks transmitted by the base station and the number of data blocks not properly received by the terminal is greater than or less than a certain threshold value.

The particular state may indicate whether the ration between the number of data blocks successfully received by the terminal and the number of data blocks unsuccessfully received by the terminal is greater than or less than a certain threshold value.

The particular state may indicate whether the signal strength of a cell in which the terminal is located (camped) is greater than or less than a certain threshold value.

The particular state may indicate the situation where the terminal did not successfully receive data blocks in sequence over a certain number of times.

Meanwhile, the base station informs the terminal as to what should be measured, and also informs about other information, such as, the certain number of times or threshold values that are to be measured, and the like.

Also, in order to allow the terminal to easily transmit reception state information to the base station, the base station allocates certain radio resources, and informs the terminals about information related to the certain radio resources that are to be used to transmit the reception state information.

Additionally, each of the terminals, transmit to the base station, reception state information with respect to a particular state that has occurred. Here, the reception state information is transmitted from each terminal to the base station through uplink radio resources the refer to information with respect to particular radio resources informed and allocated by the base station.

Specifically, the radio resource that is used when transmitting the reception state information on the uplink may be, for example, a random access channel (RACH).

Other examples of the radio resource that is used when transmitting the reception state information on uplink may be a dedicated traffic channel (DTCH) or a dedicated control channel (DCCH). Furthermore, another example of the radio resource that is used when transmitting the reception state information on uplink may be a particular preamble (e.g., a dedicated preamble) of the RACH. Namely, the base station allocates a particular MBMS dedicated preamble that is used in sending a response to the base station by each terminal that receives the particular MBMS services, and each terminal sends feedback to the base station by using the particular MBMS service dedicated preamble. Thus, based upon the particular state (i.e., information corresponding to the condition to send the reception state information provided from the base station), each terminal creates (or generates) information related to the reception status of the MBMS service (i.e., reception state information), and transmits such created reception state information to the base station through a particular preamble of the RACH.

Also, the radio resource used by each terminal in transmitting the reception state information on the uplink may be a particular signature of the RACH. Specifically, the base station allocates a particular MBMS service dedicated signature that is used by each terminal that received the particular MBMS service in transmitting a response to the base station, and each terminal sends feedback to the base station by using the particular MBMS service dedicated signature. Namely, based upon the particular state (i.e., information corresponding to the condition to send the reception state information provided from the base station), each terminal generates information related to the reception state of the MBMS service (i.e., reception state information), and transmits the generated reception state information to the base station through a particular signature of the RACH.

Meanwhile, the information related to the radio resources, which need to be used in sending information (e.g., reception state information) that the base station sends to the terminal, or the information related to a particular state (situation or condition) needed for the terminal to send the reception state information is transmitted through a MCCH (MBMS Control Channel or Multicast Control Channel) or a SIB (system information block).

The uplink radio resource for transmitting a response with respect to the particular MBMS service may be, for example, a CQI channel.

When a particular state occurs, each terminal may send a response to the base station by using a particular code value of the CQI channel.

Figure 8:
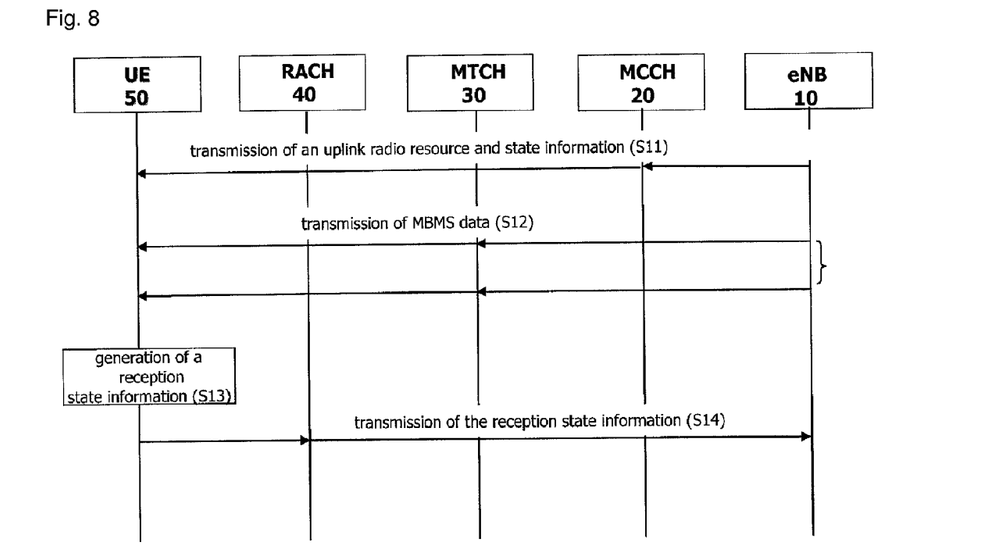
FIG. 8 shows an exemplary diagram illustrating a transmission of reception state information with respect to a particular MBMS service using a dedicated preamble that according to the present disclosure.

FIG. 8 shows an exemplary diagram illustrating a transmission of reception state information with respect to a particular MBMS service using a dedicated preamble that according to the present disclosure. In FIG. 8, although a plurality of terminals would receive the MBMS service, only one terminal (50) is illustrated merely to explain the present disclosure with simplicity.

Referring to FIG. 8, a base station (10; eNB) may transmit information related to an uplink radio resource, which will be used for a transmission of a reception state information with respect to the MBMS service, to a terminal (50; UE) using a MCCH (MBMS Control Channel, also referred for a Multicast Control Channel) (20) or a BCCH. (S11) Here, the base station may allocate the uplink radio resource not by each terminal (50), but by each MBMS service (i.e., per MBMS service), thereby each terminal (50) may commonly use the uplink radio resource per MBMS service. Also, the base station (10) may transmit information related to a particular state that indicates a condition for sending the reception state information by the terminal.

The base station (10) may transmit the particular MBMS data (i.e., MBMS data block sequence) to each terminal (50) via a MTCH (30). (S12) Thus, the particular MBMS service is provided to each terminal (50) by receiving the MBMS data through the MTCH.

In the step of receiving the MBMS data (S12), if some condition (state, status) is met, the terminal may generate reception state information with respect to the MBMS service. Here, the terminal (50) may generate the reception state information based on the received information [i.e., information related to the particular state that indicates a condition for sending the reception state information by the terminal] from the base station (10) in the step of S11. As such, the generated reception state information with respect to the MBMS service may be part of content which the terminal reports a reception state of the MBMS service to the base station.

The terminal (50) may transmit the generated reception state information (that generated in S13) to the base station (10) using the allocated radio resource (that provided in S11). For example, the terminal may transmit the generated reception state information using a preamble of a particular RACH (40). (S14). Also, the reception state information may be transmitted from the terminal to the base station using a particular signature of the RACH.

For instance, the base station (10) may assign a particular signature of the RACH (40) with respect to a particular MBMS service, and if the terminal (50) does not successfully receive a particular MBMS service data greater than 20% (example of the particular condition described above) of the all MBMS service data, the terminal (50) may transmit a reception state information [i.e., feedback information] with respect to the particular MBMS service to the base station (10). Namely, as illustrated in FIG. 8, the terminal which receives the particular MBMS service may perform the steps of S13, S14 when the terminal itself does not receive the MBMS service data block greater than 20% or more of the all MBMS service data. Therefore, the terminal (50) may perform the RACH process and the terminal may transmit the particular signature which assigned by the base station in previous step.

The base station, which provides the MBMS service, may continuously receive the RACH, and if the particular signature (which was assigned previously) is received from the terminal, the base station may notice that there is a terminal does not receive the MBMS service data greater than 20% or more of the all MBMS service data. After that, the base station (10) may set or adjust a radio configuration parameter. For example, the base station (10) may set of adjust a configuration parameter of the particular MBMS service.

The base station may also provide a probability factor to the terminal in order to minimize a complexity of uplink channel which is caused by a transmission of large amount of reception state information from a plurality of terminals. This probability factor may be provided to the terminal in the step of S11. The terminal having reception state information may determine whether to transmit the reception state information or not using the probability factor described above.

For example, if the probability factor is 20, the terminal may select a random value among 0 to 100, then may transmit the reception state information to the base station after generating step only when the selected random value is less than 20, otherwise, the reception state information will not be transmitted to the base station.

Another example may be provided as follows, if it is assumed that the base station receives reception state information indicating many errors in a particular MBMS service data, the base station may increase a transmission power for the particular MBMS service. Also, if the base station receives a feedback that indicates a signal of a particular MBMS service is too strong, the base station may reduce a transmission power of the particular MBMS service.

Namely, the base station may need to receive feedback information related to a reception state (status) of a MBMS service from the terminal in order to provide better quality of MBMS service and to effectively utilize a radio resource(s).

To do this, the base station may transmit a measurement control message to the terminal for requesting such feedback. The measurement control message may be a message to inform that what type of parameter (data, information) need to be measured by the terminal with respect to the MBMS service, in what time frame such measurement should be performed, or in what condition a measurement result should transmit to an UTRAN. For example, the base station may indicate the terminal to measure a power of received MBMS service signal, and may indicate to the terminal that such measurement has to be performed in every frame. Also, if the power of the received signal is less than a certain threshold value and such state is continued for a certain time period, the base station may instruct or order the terminal to report a measurement information through the measurement control message. The terminal which receives the measurement control message, may perform the measurement as instructed in the measurement control message, then may transmit a measurement report message with respect to a corresponding service to the UTRAN if the result of the measurement satisfies a certain condition (which may be included in the measurement control message).

The present disclosure may provide a method of providing a point to multipoint service in a wireless communications system, the method comprising: receiving a feedback configuration parameter from a base station; receiving a point to multipoint service data; and transmitting feedback information using the received feedback configuration parameter, wherein the feedback configuration parameter is allocated per each point to multipoint service, the feedback configuration parameter is related to a radio resource for a transmission of feedback information, the feedback information is an ACK/NACK signal, a RACH preamble, or a specific Channel Quality Indicator (CQI) code value, the feedback information is transmitted to the network only when a certain condition is met, the ACK signal is transmitted to the network when the point to multipoint service data is successfully received and the NACK signal is transmitted to the network when the point to multipoint service data is not successfully received, only the ACK signal is transmitted to network when the point to multipoint service data is successfully received and the NACK signal is not transmitted to the even if the point to multipoint service data is not successfully received, only the NACK signal is transmitted to network when the point to multipoint service data is not successfully received and the ACK signal is not transmitted to the network even if the point to multipoint service data is successfully received, the certain condition is previously set by each terminal that is subscribed in the point to multipoint service, and the feedback information is transmitted to the network based on whether the each receiving steps are successfully received.

The present disclosure may also provide a method of providing a point to multipoint service in a wireless communications system, the method comprising: transmitting a feedback configuration parameter to at least one terminal that is subscribed in the point to multipoint service; transmitting a point to multipoint service data to the at least one terminal; receiving feedback information from the at lest one terminal that uses the feedback configuration parameter for a transmission of the feedback information, adjusting a radio configuration parameter according to the received feedback information, and transmitting the point to multipoint service data to the at least one terminal using the adjusted radio configuration parameter, wherein the radio configuration parameter includes at least one of a code, a power, a frequency, or time that are allocated for the point to multipoint service, the feedback configuration parameter is allocated per each point to multipoint service, the feedback configuration parameter is related to a radio resource for a transmission of feedback information, the feedback information is an ACK/NACK signal, a RACH preamble, or a specific Channel Quality Indicator (CQI) code value, the ACK signal is received from the at least one terminal when the point to multipoint service data is successfully received by the at least one terminal and the NACK signal is received from the at least one terminal when the point to multipoint service data is not successfully received by the at least one terminal, only the ACK signal is received from the at least one terminal when the point to multipoint service data is successfully received by the at least one terminal and the NACK signal is not received even if the point to multipoint service data is not successfully received by the at least one terminal, only the NACK signal is received from the at least one terminal when the point to multipoint service data is not successfully received by the at least one terminal and the ACK signal is not received even if the point to multipoint service data is successfully received by the at least one terminal.

It is also can be said that the present disclosure may provide a mobile terminal for providing a point to multipoint service in a wireless communications system, the mobile terminal comprising: a transceiver adapted to transmit or receive a data related to the point to multipoint service; a memory adapted to store the data transmitted or received via the transceiver or from an external source; and a processor cooperating with the transceiver and the memory and adapted to perform the steps of, receiving a feedback configuration parameter from a base station; receiving a point to multipoint service data; and transmitting feedback information using the received feedback configuration parameter.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of providing a Multimedia Broadcast/Multicast Service (MBMS) service in a wireless communications system, the method comprising:
   receiving a feedback configuration parameter from a base station,
      wherein the feedback configuration parameter is related to a radio resource for a transmission of feedback information with respect to the MBMS service,
      wherein the feedback configuration parameter is received through an MBMS Control Channel (MCCH), and
      wherein the feedback configuration parameter is allocated per each MBMS service;
   receiving MBMS service data;
   transmitting the feedback information using the received feedback configuration parameter,
      wherein the feedback information is an ACK/NACK signal,
      wherein the feedback information is transmitted to the base station only when a certain condition is met,
      wherein the certain condition is previously set by each terminal that is subscribed in the MBMS service,
      wherein only the NACK signal is transmitted to the base station when the MBMS service data is not successfully received, and
      wherein the ACK signal is not transmitted to the base station even if the MBMS service data is successfully received;

receiving a measurement control message from the base station, the measurement control message specifying at least a parameter to be measured and a condition for transmitting a measurement report message;

measuring the specified parameter with respect to the MBMS service; and transmitting a result of the measurement of the specified parameter to the base station when the condition for transmitting a measurement report message is satisfied.

2. The method of claim 1, wherein the feedback information is transmitted to the base station based on whether the feedback configuration parameter and the MBMS service data are successfully received.

3. A method of providing a Multimedia Broadcast/Multicast Service (MBMS) service in a wireless communications system, the method comprising:

transmitting a feedback configuration parameter to at least one terminal that is subscribed in the MBMS service,
wherein the feedback configuration parameter is related to a radio resource for a transmission of feedback information by the at least one terminal with respect to the MBMS service,
wherein the feedback configuration parameter is transmitted through an MBMS Control Channel (MCCH), and
wherein the feedback configuration parameter is allocated per each MBMS service;

transmitting MBMS service data to the at least one terminal;

receiving the feedback information from the at least one terminal according to the feedback configuration parameter,
wherein the feedback information is an ACK/NACK signal,
wherein only the NACK signal is received from the at least one terminal when the MBMS service data is not successfully received by the at least one terminal, and
wherein the ACK signal is not received from the at least one terminal even if the MBMS service data is successfully received by the at least one terminal;

transmitting a measurement control message to the at least one terminal, the measurement control message specifying at least a parameter to be measured and a condition for transmitting a measurement report message; and receiving a result of a measurement from the at least one terminal when the condition for transmitting a measurement report message is satisfied, wherein the measurement is of the specified parameter with respect to the MBMS service.

4. The method of claim 3, further comprising:
adjusting a radio configuration parameter according to the received feedback information.

5. The method of claim 4, further comprising:
transmitting the MBMS service data to the at least one terminal using the adjusted radio configuration parameter.

6. The method of claim 4, wherein the radio configuration parameter includes at least a code, a power, a frequency, or time allocated for the MBMS service.

7. A mobile terminal for providing a Multimedia Broadcast/Multicast Service (MBMS) service in a wireless communications system, the mobile terminal comprising:

a transceiver adapted to transmit or receive data related to the MBMS service;

a memory adapted to store the data transmitted or received via the transceiver or from an external source; and a processor cooperating with the transceiver and the memory and adapted to:

receive a feedback configuration parameter from a base station,
wherein the feedback configuration parameter is related to a radio resource for a transmission of feedback information with respect to the MBMS service,
wherein the feedback configuration parameter is received through an MBMS Control Channel (MCCH), and
wherein the feedback configuration parameter is allocated per each MBMS service;

receive MBMS service data;

transmit feedback information using the received feedback configuration parameter,
wherein the feedback information is an ACK/NACK signal,
wherein the feedback information is transmitted to the base station only when a certain condition is met,
wherein the certain condition is previously set by each terminal that is subscribed in the MBMS service,
wherein only the NACK signal is transmitted to the base station when the MBMS service data is not successfully received, and
wherein the ACK signal is not transmitted to the base station even if the MBMS service data is successfully received;

receive a measurement control message from the base station, the measurement control message specifying at least a parameter to be measured and a condition for transmitting a measurement report message;

measure the specified parameter with respect to the MBMS service; and transmit a result of the measurement of the specified parameter to the base station when the condition for transmitting a measurement report message is satisfied.

* * * * *